March 22, 1966  G. B. DOREY  3,241,730
OPERATING MEANS FOR SLIDING GATE
Filed Nov. 12, 1964  2 Sheets-Sheet 1
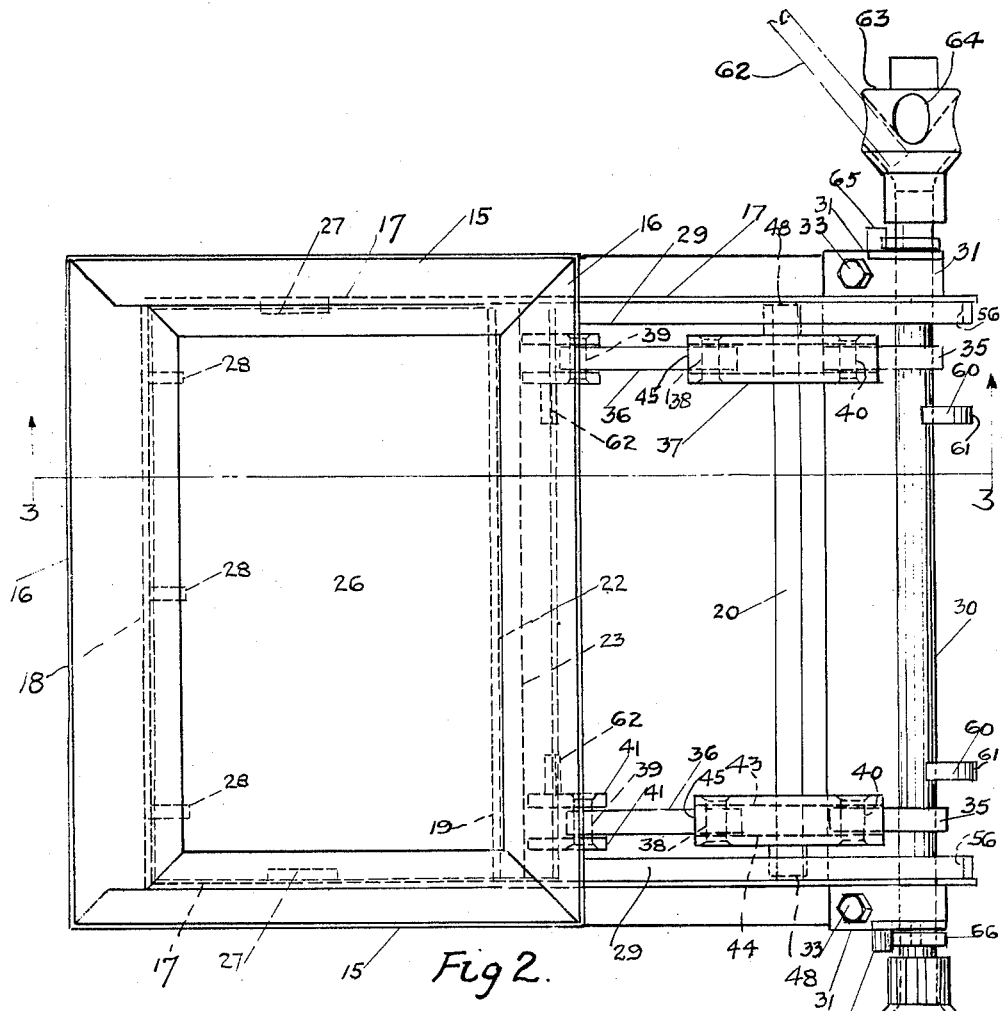
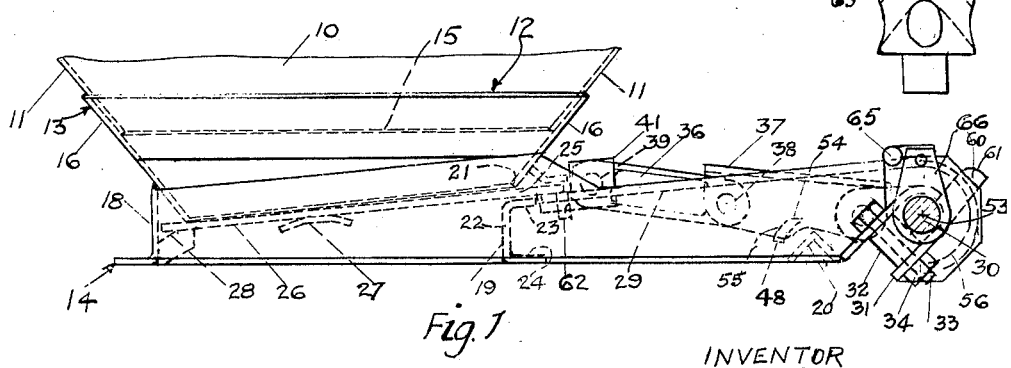
INVENTOR
George B Dorey

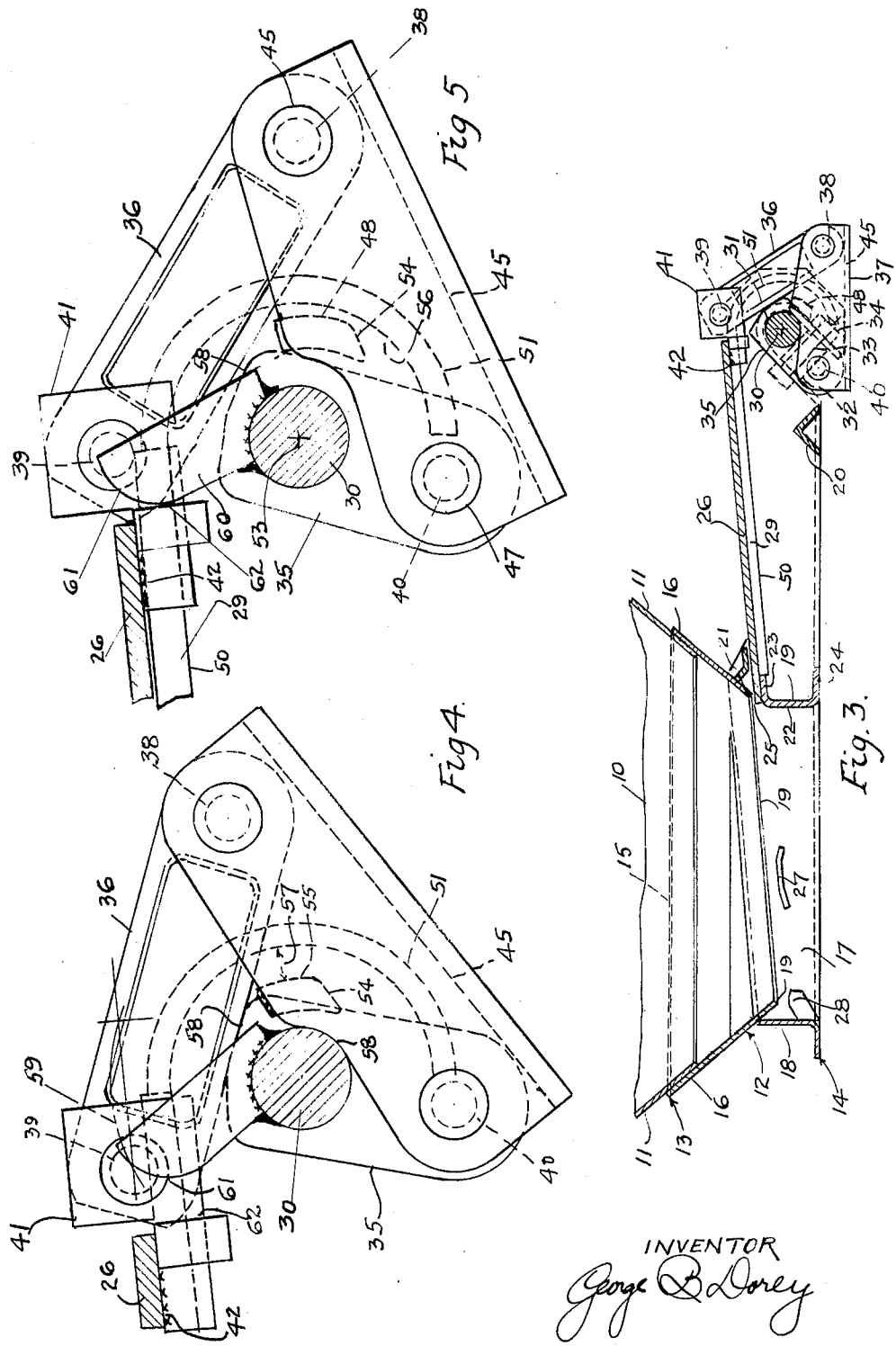

3,241,730
Patented Mar. 22, 1966

3,241,730
OPERATING MEANS FOR SLIDING GATE
George B. Dorey, Westmount, Quebec, Canada, assignor to Continental Transport Appliances Limited, Montreal, Quebec, Canada, a corporation of Canada
Filed Nov. 12, 1964, Ser. No. 410,473
3 Claims. (Cl. 222—505)

The invention relates to improved operating means for a sliding gate of the type commonly employed for controlling discharge of lading from a hopper bin. The improvement is concerned with a movable gate structure operable by means of a rotatable shaft and winding linkage pivoted at one end to the gate and having the opposite end connected with the shaft.

The invention is by way of an improvement on my United States pending application, Serial No. 350,277 filed March 9, 1964. In said prior application stop means are associated with the linkage for limiting withdrawal of the gate in an opening direction. It is an object of the present invention to provide means carried by the shaft having the dual function of limiting opening of the gate as well as acting as starting means for initiating closing movement of the gate.

The invention further resides in the provision of starter means for initiating closing movement of the gate in combination with lost motion of the linkage whereby said linkage is rendered inactive during movement of the gate under the influence of the starter means.

For further comprehension of the invention reference may be had to the accompanying drawings wherein a four-sided hopper bin is shown as fitted with an outlet structure embodying the improvement and wherein:

FIGURE 1 is a side elevational view of the lower portion of a hopper bin having a sliding gate structure incorporating the improved operating means, said view showing the gate in closed position and the shaft operating handle eliminated to better illustrate the parts.

FIGURE 2 is a plan view of the structure shown in FIGURE 1 with the walls of the hopper bin eliminated.

FIGURE 3 is a vertical longitudinal sectional view taken on a line 3—3 of FIG. 2 showing the gate in opened position and the linkage enfolded on the shaft as seen at the completion of the gate opening movement.

FIGURE 4 is a fractional elevational enlarged view of the winding linkage mechanism showing the relation of the parts as positioned at the commencement of the gate raising movement.

FIGURE 5 is a view similar to FIGURE 4 except that the linkage is inactive with the gate being moved towards closed position under the influence of the caming lugs.

In said drawings, the lower portion of the hopper bin is shown as defined in part by longitudinally sloping side walls 10—10 which converge downwardly inwardly and meet with similarly downwardly converging transverse walls 11—11 to form a four-sided inverted truncate shaped hopper.

The lower portion of the hopper bin is surrounded by an outlet assembly 12 formed of an upper section 13 and a lower section 14. The upper section 13 includes longitudinally extending walls 15—15 which overlie the side walls 10—10 and meet with transversely extending end walls 16—16 which in turn overlie the end walls 11—11.

The upper section 13 is nested in the lower section 14 of the assembly and said lower section 14 is formed in part by longitudinally extending transversely spaced side wall members 17—17 meeting with transversely extending members 18, 19 and 20. Said side members 17—17 in combination with the members 18 and 19 form a rectangular shaped chute of appreciable depth.

The sloping walls 15—15 and transverse end wall 16 include downwardly sloping extensions which extend a limited distance inwardly beyond the side walls 17—17 and the end wall 18 and the marginal edges as seen at 19 form three sides of the discharge area of the hopper bin. The fourth side of the discharge area is formed by the lower marginal edge 21 of the sloping wall 16 remote from end member 18.

The lower transverse member 19 is preferably in the form of a channel shape and includes a vertically disposed web 22 and upper and lower flanges as indicated at 23 and 24 respectively.

The upper flange 23 is spaced from the lower marginal edge 21 of wall 16 to provide a slotted opening 25 for the passage of a sliding gate 26 therethrough. The sliding gate 26 is adapted to close the discharge area as formed by the marginal edges of the extensions of the sloping walls 15 and 16. The gate 26 when in closed position inclines downwardly towards the end wall 18 and is supported in closed position at an intermediate location by lugs 27—27 and the overhanging end of the gate rests on a series of lugs 28 carried by the end wall 18.

The gate in its closed position underlies the eaves of the sloping extensions of walls 15 and 16 and is movable therefrom beyond the discharge area to an open position. The side members 17—17 are extended beyond the discharge area and said extensions carry downwardly sloping runways 29—29 on which the gate is movable to open position.

Mechanism for moving the gate includes a rotatable shaft 30 journalled in bearings 31—31 which in turn are carried by the side members 17—17 adjacent the distal ends thereof. The bearings 31 are in the form of open ended loops within which the shaft is positioned and retained by bearing blocks 32 which in turn are held in place by bolts and nuts as indicated at 33 and 34 respectively.

The shaft 30 is fitted with radially extending arms 35—35 which are non-rotatably mounted thereon in axially spaced relation to lie inwardly of and adjacent to the runways 29. The radial arms 35 are connected with the gate 26 by means of linkages including terminal links 36 and intermediate links 37. The links 36 and 37 are pivotally united at 38 and the connection between the linkages and the gate and shaft is effected by pivots 39 and 40 respectively. The pivot pins 39 extend through a pair of walls 41—41 which in turn are welded to the under side of the gate as at 42.

The intermediate links 37 are preferably of U shape including side walls 43 and 44 and a connecting top wall 45 and straddle the terminal links 36 and radial arms 35 and are pivotally united with the said respective members by the pivots 38 and 40 which extend through the side walls 43 and 44. The top wall 45 extends throughout the length of the side walls 43 and 44 and forms an abutment for engaging the terminal link and radial arm to limit the extent of overcenter knuckling movement of the linkage when in extended position (FIGS. 1 and 2).

The pivots 38, 39 and 40 are preferably in the form of headless pins and are welded at their respective ends to the associated side walls as seen at 45, 46 and 47 respectively. The linkage mechanisms as constituted by the arms 35 and link members 36 and 37, as best seen by reference to FIGURE 1, assume an overcenter toggle locked position forming a strut-like rigid connection between the shaft 30 and the gate 26 to positively maintain the latter in closed position.

The opening operation of the gate is effected by a folding of the linkage on the shaft 30 consequent upon rotation of the latter in a clockwise direction as viewed in FIGS. 1 and 3. Upon reverse rotation of the shaft to close the gate from its full open position the linkage unfolds and eventually assumes the straightened locking position shown in FIGS. 1 and 2. In order to control the unfolding movement of the linkage consequent on reverse rotation of the shaft to close the gate, the intermediate links 37 are each provided with a shoulder 48 extending laterally from the wall 44 for co-operation with trackways as will be described.

The undersurface 50 of the runways 29 constitutes a flat trackway extending lengthwise for substantially the full extent of travel of the gate and thereafter the trackway is continued by an arcuate section 51 to extend around the shaft and provide a trackway surface concentrically related to the axis 53 of the shaft 50.

The shouldered part 48 of the links 37 is formed with a flat uppersurface 54 for co-operation with the flat undersurface 50 of the runway 29 and with an arcuate shaped surface 55 adapted to engage with the surface 56 of the arcuate shaped section 51. The function of the arcuate surface 55 is to engage with the inner surface 56 of the trackway section 51 to limit unfolding of the linkage during substantially the initial half revolution of the shaft in a closing direction and control the degree of unfolding to allow the multiple linkage to operate in compression for exerting closing pressure on the gate. With the establishment of bearing contact between the arcuate surfaces 55 and 56 there is no further unfolding and the linkage operates as fixed arms of the shaft throughout the maintainance of such contact. During the opening movement of the gate, the linkage, as will be understood, is tightly held in enfolded relation on the shaft and the surface 55 is spaced from the surface 56 of the trackway section 51 to an extent shown at 57.

The spacing 57 provides for limited lost motion upon reversal of rotation of the shaft to effect closing of the gate from full opened position. With the linkage in enfolded relation on the shaft upon winding movement of the linkage in an opening direction, the terminal links 37 seat at 58 on the arm means and thereafter operate as fixed radial arms. The seating at 58 is effected before the pivotal connection 39 reaches a normal to the axis 53 of the shaft and consequently the pivoted end of the gate is swung upwardly and forwardly beyond the axis of the shaft along an arc 59.

The initial return closing movement of the gate from the fully opened position is accomplished through the medium of lugs 60 which extend radially from the shaft and are each formed with a cam face 61 for engagement with a seat 62 on the gate. Upon movement of the gate by the caming action of lugs 60 on the seats 62 it will be noted that the linkage is inactive by reason of the lost motion 57, which results in the linkage trailing the gate. The trailing action of the linkage is continued until such time as the arcuate surface 55 of the shoulder 48 makes contact with the trackway surface 56 whereupon the linkage becomes the driving force in advance of the lugs 60.

The lugs 60 in addition to their function as starters also act as detents to limit direct withdrawal of the gate to an extent from which it could not be returned by shaft rotation and in this respect obviates the necessity for incorporating stops in the linkage such as featured in my prior application heretofore referred to.

Rotation of the shaft is preferably effected by a removable bar indicated conventionally at 62 and to this end an operating head 63 having a plurality of socket openings 64 is fitted on each end of the shaft for receiving the bar.

The extent of shaft rotation is limited in its closing and opening movements by a stop 65 in cooperation with a radially extending wall 66.

What I claim as new is:

1. In a hopper having an opening for discharge of lading and a sliding closure for the opening, the herein described improved means for moving the gate in an opening and a closing direction including:
   (a) a rotatable shaft,
   (b) winding linkage mechanism connected to the shaft and gate and foldable to have seating relation with the shaft for opening movement of the gate,
   (c) a detent on the shaft engageable with the gate to arrest opening movement thereof, and
   (d) said detent being adapted to engage the gate for imparting initial closing movement thereof.

2. The invention set forth in claim 1 wherein the winding linkage operates as fixed arm means to lift the connected end of the gate over and beyond the shaft during final opening movement of the gate.

3. The invention set forth in claim 2 wherein the detent engages with the gate at the initiation of the gate closing movement in advance of the linkage.

References Cited by the Examiner
UNITED STATES PATENTS

| | | | |
|---|---|---|---|
| 2,512,451 | 6/1950 | Withall | 222—505 X |
| 3,110,270 | 11/1963 | Ingram | 222—505 X |

LOUIS J. DEMBO, *Primary Examiner.*